United States Patent
De Cnodder et al.

(10) Patent No.: US 7,012,923 B2
(45) Date of Patent: Mar. 14, 2006

(54) METHOD FOR ALLOCATING A BANDWIDTH BETWEEN NETWORK TERMINALS IN A COMMUNICATION NETWORK AND NETWORK INCLUDING A MEDIUM ACCESS CONTROLLER FOR PERFORMING SUCH A METHOD

(75) Inventors: Stefaan Jozef De Cnodder, Lille (BE); Ludwig Alice Julienne Pauwels, Beveren (BE)

(73) Assignee: Alcatel, Paris (FR)

( * ) Notice: Subject to any disclaimer, the term of this patent is extended or adjusted under 35 U.S.C. 154(b) by 952 days.

(21) Appl. No.: 10/025,685

(22) Filed: Dec. 26, 2001

(65) Prior Publication Data

US 2002/0118695 A1 Aug. 29, 2002

(30) Foreign Application Priority Data

Dec. 28, 2000 (EP) .................................. 00403706

(51) Int. Cl.
*H04L 12/56* (2006.01)

(52) U.S. Cl. ........................... 370/395.41; 370/395.21; 375/295

(58) Field of Classification Search ................ 370/468, 370/395.21, 395.4, 395.41, 395.42, 395.43; 375/295
See application file for complete search history.

(56) References Cited

U.S. PATENT DOCUMENTS

| | | | |
|---|---|---|---|
| 5,461,611 A | * 10/1995 | Drake et al. ................. 370/420 |
| 5,745,837 A | * 4/1998 | Fuhrmann .................... 725/114 |
| 5,745,838 A | * 4/1998 | Tresness et al. ............. 725/128 |
| 6,002,667 A | * 12/1999 | Manning et al. ............. 370/232 |
| 6,161,138 A | * 12/2000 | Gross et al. ................. 709/225 |
| 6,665,308 B1 | * 12/2003 | Rakib et al. ................. 370/441 |
| 6,707,817 B1 | * 3/2004 | Kadambi et al. ........... 370/390 |
| 6,751,684 B1 | * 6/2004 | Owen et al. .................. 710/29 |
| 6,801,500 B1 | * 10/2004 | Chandran ................ 370/230.1 |
| 6,882,623 B1 | * 4/2005 | Goren et al. ................. 370/230 |
| 6,917,628 B1 | * 7/2005 | McKinnin et al. .......... 370/468 |
| 2001/0001616 A1 | * 5/2001 | Rakib et al. ................. 375/259 |
| 2001/0033581 A1 | * 10/2001 | Kawarai et al. ............. 370/468 |

FOREIGN PATENT DOCUMENTS

| EP | 0 544 975 B1 | 6/1993 |
|---|---|---|
| EP | 0 957 654 A1 | 11/1999 |

\* cited by examiner

*Primary Examiner*—Wellington Chin
*Assistant Examiner*—Binh Q Nguyen
(74) *Attorney, Agent, or Firm*—Sughrue Mion, PLLC

(57) ABSTRACT

A method for allocating a bandwidth between a plurality of network terminals ($NT_x$) coupled, via a common link (L), to a main network station (LT) in a communication network.

A medium access controller (MC) forwards permits to the network terminals, each permit containing a terminal identifier and allowing a predetermined share of bandwidth. It comprises two sets of counters, each set including one counter ($G_x$ or $F_x$) for each terminal. The bandwidth is split into a guarantee bandwidth that is shared by operating the first set of counters and an excess bandwidth that is shared by operating the second set of counters. The guaranteed bandwidth is allocated according to fixed weights, and the excess bandwidth is also allocated according to weights. The weights for the excess bandwidth are either fixed or varying according to the load status of the terminals.

19 Claims, 3 Drawing Sheets

METHOD FOR ALLOCATING A BANDWIDTH BETWEEN NETWORK TERMINALS IN A COMMUNICATION NETWORK AND NETWORK INCLUDING A MEDIUM ACCESS CONTROLLER FOR PERFORMING SUCH A METHOD

BACKGROUND OF THE INVENTION

The present invention relates to a method for allocating a bandwidth between a plurality of network terminals coupled, via a common link, to a main network station, in a communication network. It also relates to a network including a medium access controller adapted to perform the method as defined above.

European patent application 0 544 975 describes a time slot management system for a time division multiple access system including a main station and a plurality of user stations via the cascade connection of a common transmission link and an individual user link. Information concerning the bandwidths respectively required for further transfer of upstream information packets by the user stations are upstream transmitted to the main station by means of dedicated time slots. Registration means, located in the main station, store values indicative of said required bandwidths to have them converted in corresponding occurrences of identities, said identities being downstream transmitted from the main station to the user stations. Each user station is allowed to transfer a predetermined amount of information packets to the main station upon detection of its own identity among downstream information. Such a management system does not differentiate among different service categories pertaining to different packets the network terminals want to transfer to the main station and the bandwidths requested by network terminals correspond to peak rates.

European patent application 0 957 654 describes a method to assign upstream time slots to a network terminal in a communication network including a central station and a plurality of network terminals coupled by means of a cascade connection of a common link and of terminal links. Network terminals transmit upstream data packets to the central station over the common link using time slots assigned to them by means of a downstream bitstream of network terminal grants generated by a medium access controller included in the network. Upstream data packets are classified in accordance associated service categories within network terminals and they are stored in storage queues according to their respective categories. A grant related to a network terminal includes a plurality of queue grants each associated to a respective storage queue within the terminal, each queue grant enabling the said terminal to transfer a predetermined amount of upstream data packets from its corresponding storage queue. The rate of the queue grant bitstream, composed of succeeding occurrences of said queue grants, is determined from at least one parameter of a parameter set associated to the corresponding storage queue and from at least one parameter of a parameter set associated to another storage queue within any of the network terminals. However, this method is not as versatile as needed when applied to a network in which actual needed bandwidth changes are frequently forwarded from the network terminals to the central station and when accordingly an efficient use of the total available bandwidth is required.

A third method for allocating or sharing a bandwidth between several network terminals in a network including a main station by allowance of permits, or grants, forwarded from the main station to the network terminals is to generate a stream of simple permits. Each permit corresponds to a share of the bandwidth. Upon detection by a network terminal of its own identifier included in a permit, the network terminal is allowed to transfer a packet comprising a predetermined amount of information. Each network terminal cyclically forward to the main station indications concerning its required bandwidth or its load status. These indications are converted by the main station in corresponding permits. A basic example of an algorithm that can be used in this third method for generating permits, is for example to define a counter for each network terminal in the main station, each counter having an associated increment value and an associated maximum. A stack or queue is included in the main station for storing permits. Every time a permit must be forwarded to the network, the main station is programmed to firstly trigger all the counters by adding to them their associated increments and in the event a counter exceeds the maximum, stacking a permit in the stack and decreasing the counter with the maximum, and secondly extracts one permit of the stack and forwards it to the network terminals.

The sharing of the available bandwidth can be modified by recalculation of the different increments, e.g. smaller increments, when no excess bandwidth is available in order to reduce the rate of permits, and bigger increments for network terminals in overload, when excess bandwidth is available. This is practicable as long as the recalculation of the bandwidth share only needs to be executed when a new network terminal is installed. However, when efficient use of the total available bandwidth is required and the network terminals frequently forward actual needed bandwidth changes, recalculation of the increments becomes too complex. In the following parts, the terms used will be the terms given in the explanation of the above third method.

SUMMARY OF THE INVENTION

An object of the present invention is to provide a simple method to implement a fair share of the available bandwidth including a guaranteed bandwidth for each network terminal.

According to the invention this object is achieved by a method for allocating a bandwidth (BW) between a plurality of network terminals ($NT_x$) coupled, via a common link, to a main network station (LT) in a communication network including a medium access controller (MC) with a guarantee counter ($G_x$) for each dependent terminal, a determined guarantee increment ($IncG_x$) and a determined guarantee maximum ($MaxG_x$) being defined for each guarantee counter and a guarantee stack (GS) for storing permits to be forwarded to the network terminals, each permit containing a network terminal identifier and corresponding to a predetermined share of bandwidth, said method including for defining permits:

a first step by:
  updating the current value of each guarantee counter ($G_x$) by adding the corresponding guarantee increment ($IncG_x$);
  stacking a permit in the guarantee stack (GS) and diminishing the current value of a guarantee counter ($G_x$) with the guarantee maximum ($MaxG_x$), if this current value exceeds the guarantee maximum ($MaxG_x$);

said method being characterised in that the medium access controller (MC) includes also a fair counter ($F_x$) for each dependant terminal with a determined fair increment ($IncF_x$) and a fair maximum ($MaxF_x$) defined for each fair counter, and a fair stack (FS) for storing permits to be forwarded to the network terminals, and in that said method also includes the following two steps for defining and forwarding permits:

a second step by:
  updating the current value of each fair counter ($F_x$) by adding the corresponding increment ($IncF_x$);
  stacking a permit in the fair stack (FS) and diminishing the current value of a fair counter ($F_x$) with the fair maximum ($MaxF_x$), if this current value exceeds the fair maximum ($MaxG_x$);

a third step to forward a permit by:
  forwarding an idle permit, if the guarantee stack (GS) and the fair stack (FS) are both empty;
  extracting a permit from the fair stack (FS) and forwarding it, if the guarantee stack (GS) is empty and the fair stack (FS) is not empty;
  extracting a permit from the guarantee stack (GS) and forwarding it, if the guarantee stack (GS) is not empty.

With such a method, the bandwidth can be shared according to the instant load status of the network terminals using computations that are simple and efficient.

An additional feature of the invention can be obtained by performing the second step only if the guarantee stack is empty, so that the fair increments have to respect a simple condition, in order to simplify their update based on the instant load status of the network terminals.

Another additional feature of the invention can be obtained by executing the second step only if the guarantee stack and the fair stack are empty, and by repeating the second step until the fair stack is not empty, so that the fair increments do not have to respect any particular condition, so that their update is even more simple.

The invention also relates to, on the one hand, a communication network including a main network station coupled to a plurality of network terminals through a common link, and a medium access controller for bandwidth allocation between network terminals on the common link, said medium access controller including counters and stacks for allocating and forwarding permits to network terminals, each permit containing a terminal identifier and corresponding to a predetermined share of bandwidth and, on the other hand to such a medium access controller. According to the invention, the medium access controller comprises:
  a guarantee counter and a fair counter for each network terminals, with a determined guarantee increment and a determined guarantee maximum for each guarantee counter and with a fair increment and a fair maximum for each fair counter;
  a guarantee stack and a fair stack for storing permits to be forwarded to the network terminals,
  programmed means for defining and forwarding permits according to the method described above.

BRIEF DESCRIPTION OF THE DRAWING

The objects and features of the invention will become more apparent and the invention itself will be best understood by referring to the following description and to the accompanying drawings wherein.

DETAILED DESCRIPTION OF THE INVENTION

Figure 1:
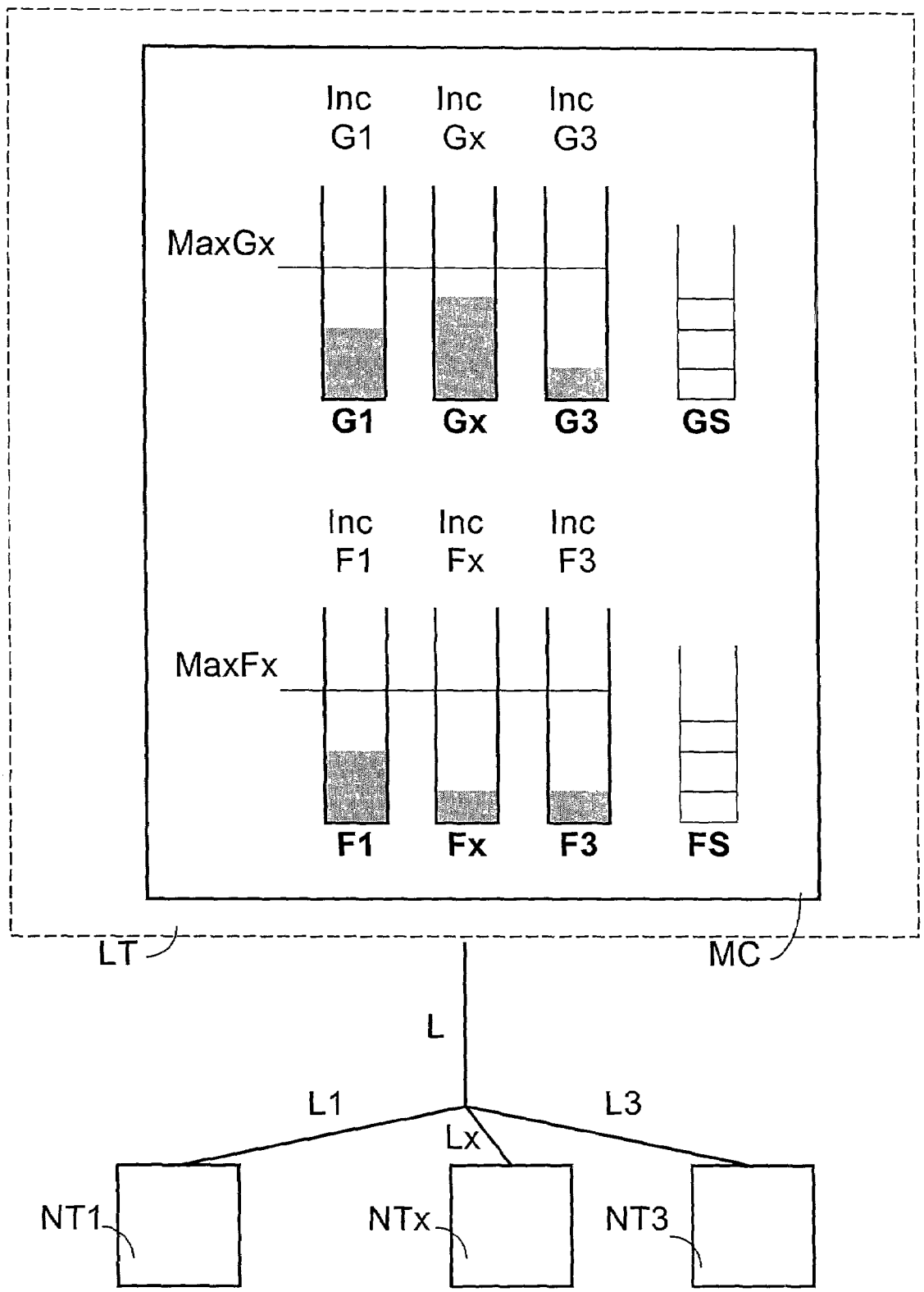
FIG. 1 is a scheme of a communication network wherein the present invention is applied.

FIG. 1 shows a communications network including a main network station LT, for instance a line terminator, which is connected to three network terminals $NT_1$, $NT_x$, $NT_3$, for instance three network terminators, through at least partly common transmission means. For example on FIG. 1, the main network station is linked to the network terminals via a tree like network comprising a common link L, connected to the main network station, and respective individual links $L_1$, $L_x$, $L_3$ between network terminals and common link. In such a network, permits are periodically forwarded by the main network station LT to the network terminals at a rate, which is for example one permit, every three microseconds. Each permit comprises a network terminal identifier and allows the related network terminal to transmit a predetermined amount of data. Thus, the part of the bandwidth allowed to a network terminal corresponds to the number of permits forwarded for this network terminal, divided by the total number of permits forwarded, during a predetermined period. According to the invention, the total available bandwidth BW is split in a guarantee bandwidth that is shared by the network terminals according to fixed weights respectively associated to the terminals, and an excess bandwidth that is fair shared according for example to the instant load statuses of the network terminals. As it will be explained, the fixed weight of a network terminal corresponds to its associated guarantee increment. In the explanations below, "x" relates to one network terminal of a network comprising "n" network terminals, and, on FIG. 1, to the second network terminal among three network terminals.

A medium access controller MC is included in the network, for instance in the main network station. It comprises a first set of counters and associated values, said set including a guarantee counter $G_x$ for each network terminal $NT_x$, with an associated guarantee increment $IncG_x$ and a guarantee maximum $MaxG_x$, this last being possibly identical for all the guarantee counters. This first set of guarantee counters is used for stacking permits in a stack called guarantee stack GS, in order to share the guarantee bandwidth. The medium access controller also comprises a second set of counters and associated values, said second set including a fair counter $F_x$ for each network terminal, with an associated fair increment $IncF_x$ and a fair maximum $MaxF_x$, this last being possibly identical for all the fair counters. This second set of counters is used for stacking permits in a stack called fair stack FS in order to allocate the excess bandwidth.

In the description below, triggering a counter means adding to the counter its associated increment, and if the current value of the counter is above its corresponding maximum, stacking a permit in the corresponding permit stack GS or FS and diminishing the counter with its corresponding maximum. When a permit is stacked, the corresponding counter is not reset, but diminished with its corresponding maximum.

Figure 2:
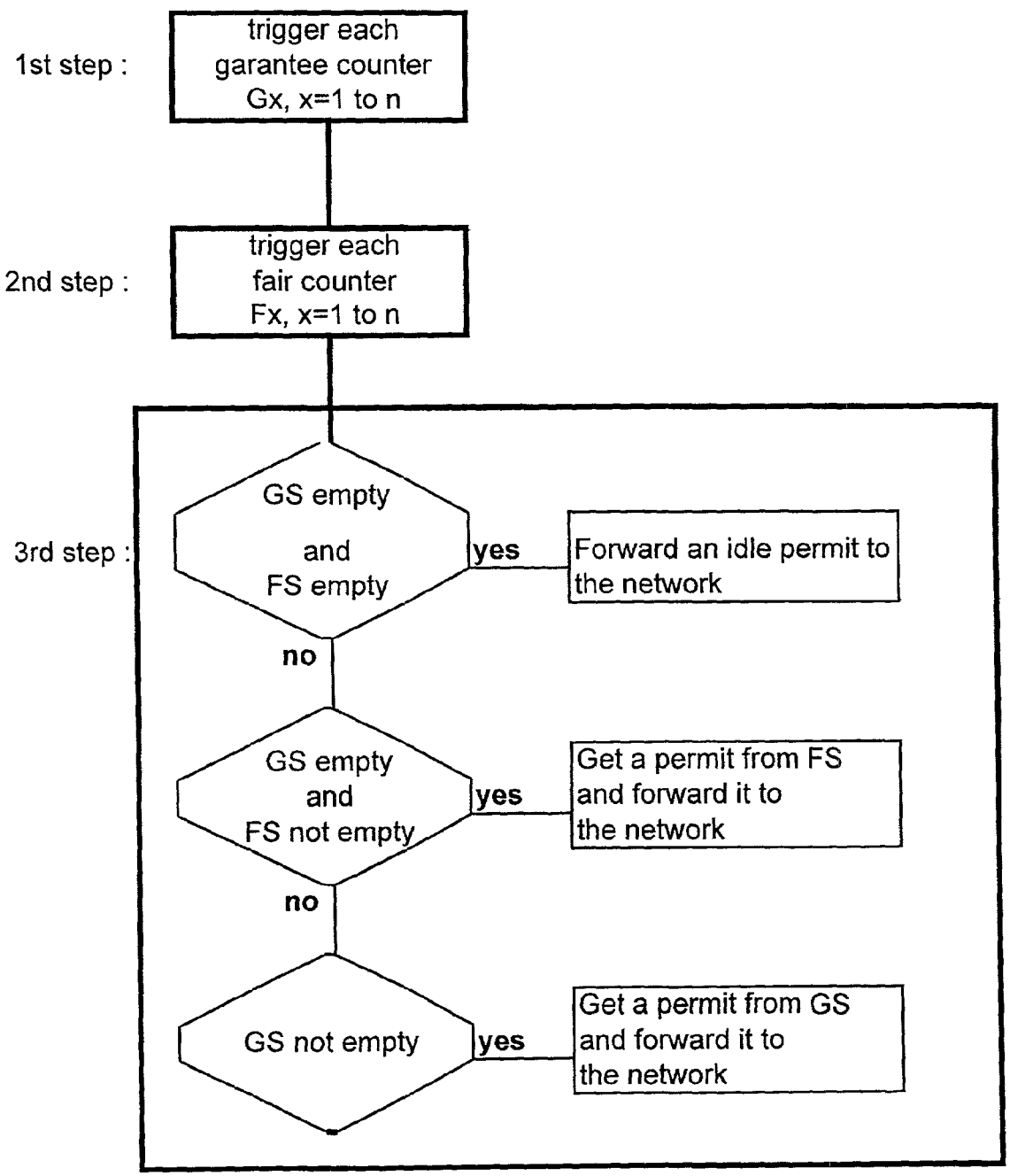
FIG. 2 is a block diagram of an algorithm for implementing the invention.

As shown in FIG. 2, forwarding permits requires three steps, the two first steps for stacking permits in corresponding stacks and the third step to extract a permit of one of the stacks and forward it to the network. The medium access controller performs the first step by triggering all the guarantee counters $G_x$, and stacking possibly the corresponding permits in the guarantee stack GS. Then, a second step is started and triggers all the fair counters $F_x$ the possible corresponding permits are stacked in the fair stack FS. In a third step, the program analyses the status of the stacks to forward one permit in the network. If the guarantee stack and the fair stack are empty an idle permit is forwarded to the network, if the guarantee stack is empty and the fair stack is not empty a permit extracted of the fair stack and forwarded to the network, and, if the guarantee stack is not empty a permit is taken out from it and forwarded to the network. According to this method, the first and second steps are performed in order to feed the permit stacks, and the third step chooses one permit by allowing the highest priority level to the guarantee stack in its choice.

In such a method, when the first loop is performed one time, the number of permits stacked in the corresponding stack GS can be zero, one, or more than one, depending on the current values of the counters, the corresponding maximum, and on the associated increments. For example, if the set of values is:

$IncG_1=3$, $IncG_x=2$, $IncG_3=1$, and $MaxG_x=10$

When the first loop is performed ten times, it stacks six permits in the guarantee stack GS, which means that statistically, the global guaranteed bandwidth is 60% of the total bandwidth BW, and that the weights of the network terminals $NT_1$, $NT_x$, $NT_3$ inside the guarantee bandwidth are their respective guarantee increments $IncG_1$, $IncG_x$ and $IncG_3$. According to this example, the ratios of the physical bandwidth guaranteed to each network terminal are: $NT_1$: 30%, $NT_x$: 20%, $NT_3$: 10%, and 40% for the excess bandwidth. It is important to notice that according to the invention, the condition:

$$\sum_{x=1}^{n} \frac{IncG_x}{MaxG_x} \leq 1$$

must be respected in order to avoid an overflow of the guarantee stack and to perform the allocation of the guarantee bandwidth of the network terminals according to their corresponding guarantee increments.

The second loop works in the same way, the excess bandwidth is shared by the network terminals according to their respective fair increments $IncF_x$, $IncF_x$ and $IncF_3$. Moreover, the guarantee increments are fixed and defined in a configuration operation in order to allow each network terminal a fixed guaranteed bandwidth. The fair increments can be updated periodically, based on the load status of the network terminals in order to manage a fair share of the excess bandwidth. For example, the bandwidth of a loaded terminal will be increased by increasing its fair increment, and the bandwidth of a non-loaded network terminal will be decreased by decreasing its fair increment. With such a method if only one network terminal $NT_x$ is loaded, it will get an important part of the total bandwidth BW allowed, said part being composed of its own part of the guaranteed bandwidth increased by the whole excess bandwidth.

In order to regulate the level in the fair stack FS, it is possible for example to have always the fair increments verifying the following $$\sum_{x=1}^{n} \left( \frac{IncF_x}{MaxF_x} + \frac{IncG_x}{MaxG_x} \right) = 1$$

condition

Which ensures that the average rate of forwarded permits is one permit each time the algorithm is performed.

Figure 3:
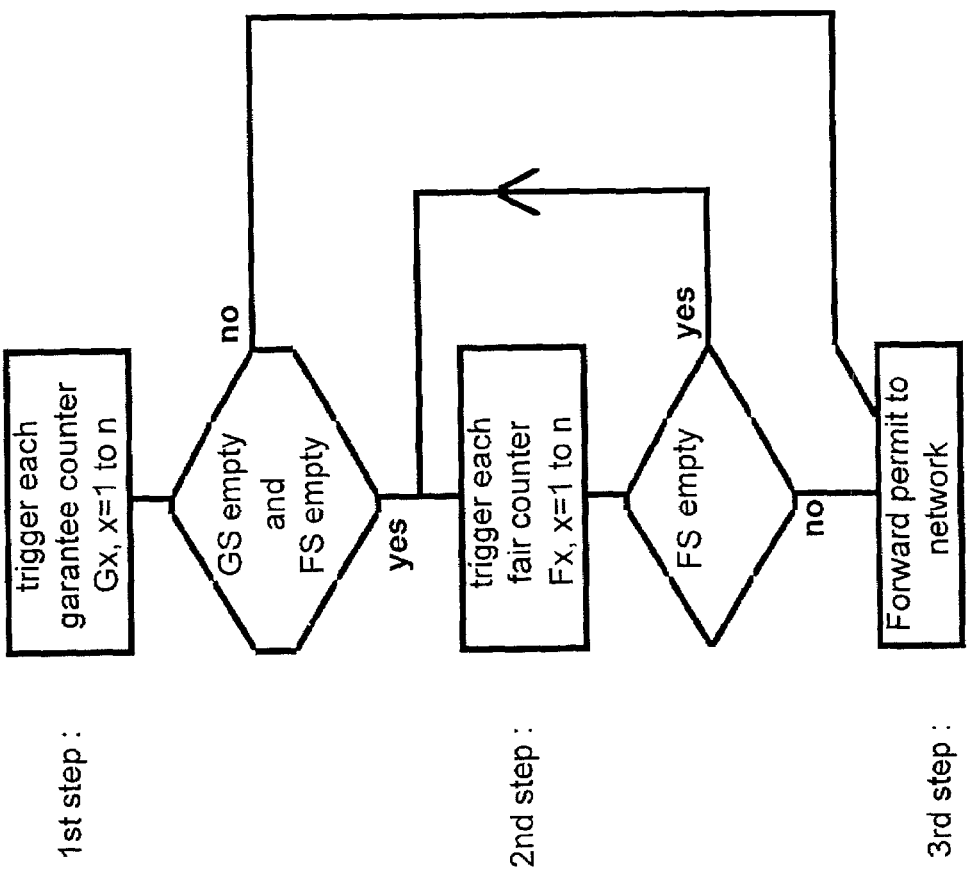
FIG. 3 is a block diagram of a preferred embodiment of the algorithm.

Another way to regulate the level of the fair stack is to perform the second step only if the guarantee stack is empty, as shown in the block scheme of FIG. 3. In this case, the fair increments will have to respect the condition:

$$\sum_{x=1}^{n} \frac{IncF_x}{MaxF_x} = 1$$

Which is a more simple condition ensuring that statistically, each time the second step is performed, one permit is stacked in the fair stack FS, and which ensures also that the fair stack will not overflow.

Figure 4:
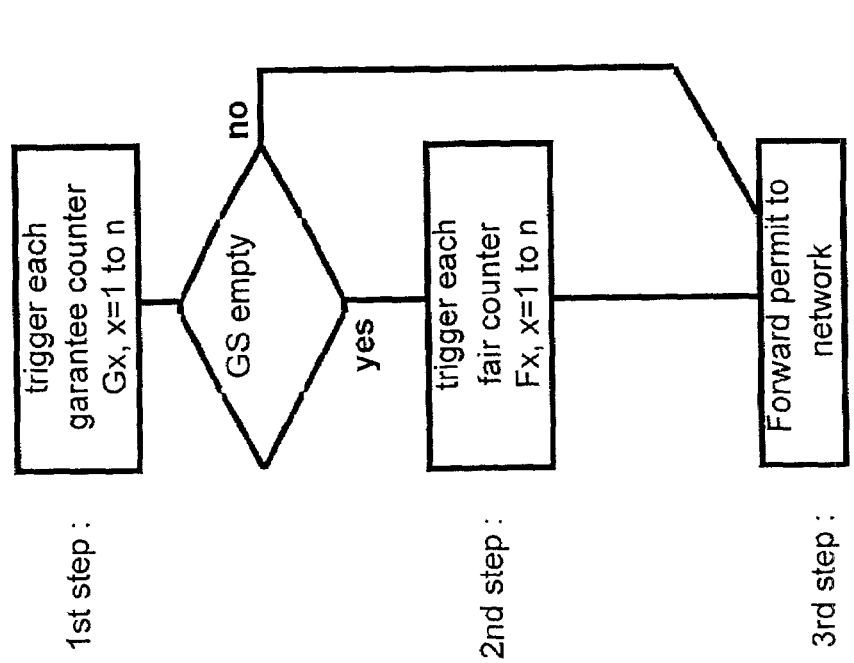
FIG. 4 is a block diagram of another preferred embodiment of the algorithm.

A third approach to ensure that at the end of the second step the fair stack will remain not empty is shown in FIG. 4. This approach is to perform the second step only if the guarantee stack and the fair stack are both empty, and possibly to repeat the second step until the fair stack is no more empty. In this third approach, the fair increments do not have to respect any particular condition, in order to simplify the update of the fair increments based on the load status. With this third approach, every time the third step is started the stack status is that at least one of the stacks is not empty, and no idle grant is forwarded to the network.

It is to be noted that in the description above, the fair increments $IncF_x$ are dynamically updated according to the load status of their corresponding terminals, but the same effect can be obtained by updating the fair maximums $MaxF_x$ and keeping the fair increments $IncF_x$ fixed. In that case, the fair maximum of a loaded terminal will be decreased to increase the corresponding permit rate, and decreased to increase the corresponding permit rate. The measurement of the load status of a terminal can be based on the queue length of a queue of this terminal, said queue length corresponding to its load status. In such a case, the queue length will be considered as if it is over a predetermined threshold value.

According to the invention, the medium access controller combines hardware and software means and more specifically counting means including the sets of guarantee and fair counters, memory means for storing the associated guarantee and fair increments and the maximal values and stacks such as for instance first in-first out stacks in order to store permits.

The invention claimed is:
1. Method for allocating a bandwidth (BW) between a plurality of network terminals ($NT_x$) coupled, via a common link, to a main network station (LT) in a communication network including a medium access controller (MC) with a guarantee counter ($G_x$) for each dependent terminal, a determined guarantee increment ($IncG_x$) and a determined guarantee maximum ($MaxG_x$) being defined for each guarantee counter and a guarantee stack (GS) for storing permits to be forwarded to the network terminals, each permit containing a network terminal identifier and corresponding to a predetermined share of bandwidth, said method including for defining permits:

a first step by:
updating the current value of each guarantee counter ($G_x$) by adding the corresponding guarantee increment ($IncG_x$);
stacking a permit in the guarantee stack (GS) and diminishing the current value of a guarantee counter ($G_x$) with the guarantee maximum ($MaxG_x$), if this current value exceeds the guarantee maximum ($MaxG_x$);

said method being characterised in that the medium access controller (MC) includes also a fair counter ($F_x$) for each dependant terminal with a determined fair increment ($IncF_x$) and a fair maximum ($MaxF_x$) defined for each fair counter, and a fair stack (FS) for storing permits to be forwarded to the network terminals, and in that said method also includes the following two steps for defining and forwarding permits:

a second step by:
updating the current value of each fair counter ($F_x$) by adding the corresponding increment ($IncF_x$);
stacking a permit in the fair stack (FS) and diminishing the current value of a fair counter ($F_x$) with the fair maximum ($MaxF_x$), if this current value exceeds the fair maximum ($MaxG_x$)

a third step to forward a permit by:
forwarding an idle permit, if the guarantee stack (GS) and the fair stack (FS) are both empty;
extracting a permit from the fair stack (FS) and forwarding it, if the guarantee stack (GS) is empty and the fair stack (FS) is not empty;
extracting a permit from the guarantee stack (GS) and forwarding it, if the guarantee stack (GS) is not empty.

2. The method according to claim 1, further characterised in that the second step is performed only if the guarantee stack (GS) is empty.

3. The method according to claim 1, further characterised in that the second step is performed only if the guarantee stack (GS) and the fair stack (FS) are empty, and in that the second step is repeated until the fair stack is not empty.

4. The method according to claim 1, further characterised in that the fair increments ($IncF_x$) and/or the fair maxima ($MaxF_x$) are dynamically updated according to a load measurement of their corresponding network terminal.

5. The method according to claim 4, further characterised in that said load measurement is based on a queue length.

6. The method according to claim 5, further characterised in that said load measurement is relevant when said queue length is over a predetermined threshold value.

7. A communication network including a main network station (LT) coupled to a plurality of network terminals ($NT_x$), through a common link (L), and a medium access controller (MC) for bandwidth allocation between network terminals on the common link, said medium access controller including counters and stacks for allocating and forwarding permits to network terminals, each permit containing a terminal identifier and corresponding to a predetermined share of bandwidth, said medium access controller (MC) comprising:

a guarantee counter ($G_x$) for each network terminals, with a determined guarantee increment ($IncG_x$) and a determined guarantee maximum ($MaxG_x$) for each guarantee counter, a guarantee stack (GS) for storing permits to be forwarded to the network terminals programmed means for defining permits according to the following first step:
said first step including:
updating the current value of each guarantee counter ($G_x$) by adding the corresponding guarantee increment ($IncG_x$);
stacking a permit in the guarantee stack (GS) and diminishing the current value of a guarantee counter ($G_x$) with the guarantee maximum ($MaxG_x$), if this current value exceeds the guarantee maximum ($MaxG_x$);
said network being characterised in that the medium access controller also comprises:
a fair counter ($F_x$) for each network terminal with a fair increment ($IncF_x$) and a fair maximum ($MaxF_x$) for each fair counter, and a fair stack (FS) for storing permits to be forwarded to the network terminals,
programmed means for defining and forwarding permits by including also the following two steps:
a second step by:
updating the current value of each fair counter ($F_x$) by adding the corresponding increment ($IncF_x$)
stacking a permit in the fair stack (FS) and diminishing the current value of a fair counter ($F_x$) with the fair maximum ($MaxF_x$), if this current value exceeds the fair maximum ($MaxF_x$);
a third step to forward a permit by:
forwarding an idle permit, if the guarantee stack (GS) and the fair stack (FS) are both empty;
extracting a permit from the fair stack (FS) and forwarding it, if the guarantee stack (GS) is empty and the fair stack (FS) is not empty;
extracting a permit from the guarantee stack (GS) and forwarding it, if the guarantee stack (GS) is not empty.

8. The communication network according to claim 7, further characterised in that the medium access controller comprises programmed means for performing the second step only if the guarantee stack (GS) is empty.

9. The communication network according to claim 7, further characterised in that the medium access controller comprises programmed means for performing the second step only if the guarantee stack (GS) and the fair stack (FS) are empty, and for repeating the second step until the fair stack is not empty.

10. The communication network according to claim 7, further characterised in that the medium access controller comprises programmed means for dynamically updating the fair increments ($IncF_x$) and/or the fair maxima ($MaxF_x$) according to a load measurement of their corresponding network terminal.

11. The communication network according to claim 10, further characterised in that the medium access controller comprises programmed means for performing said load measurement based on a queue length.

12. The communication network according to claim 11, further characterised in that the medium access controller comprises programmed means for performing said load measurement by comparing said queue length to a predetermined threshold value.

13. A communication network according to claim 7, characterised in that it comprises a medium access controller included in a main network station.

14. A medium access controller for a communication network including a main network station (LT) coupled to a plurality of network terminals ($NT_x$), through a common link (L), and a medium access controller (MC) for bandwidth allocation between network terminals on the common link, said medium access controller including counters and stacks for allocating and forwarding permits to network terminals, each permit containing a terminal identifier and corresponding to a predetermined share of bandwidth, said medium access controller (MC) comprising a guarantee counter ($G_x$) for each network terminal, with a determined guarantee increment ($IncG_x$) and a determined guarantee maximum ($MaxG_x$) for each guarantee counter, a guarantee stack (GS) for storing permits to be forwarded to the network terminals programmed means for defining permits according to the following first step:

said first step including:

updating the current value of each guarantee counter ($G_x$) by adding the corresponding guarantee increment ($IncG_x$);

stacking a permit in the guarantee stack (GS) and diminishing the current value of a guarantee counter ($G_x$) with the guarantee maximum ($MaxG_x$), if this current value exceeds the guarantee maximum ($MaxG_x$);

said medium access controller being characterised in that it also comprises:

a fair counter ($F_x$) for each network terminal with a fair increment ($IncF_x$) and a fair maximum ($MaxF_x$) for each fair counter, and a fair stack (FS) for storing permits to be forwarded to the network terminals, programmed means for defining and forwarding permits by including also the following steps:

a second step by:

updating the current value of each fair counter ($F_x$) by adding the corresponding increment ($IncF_x$);

stacking a permit in the fair stack (FS) and diminishing the current value of a fair counter ($F_x$) with the fair maximum ($MaxF_x$), if this current value exceeds the fair maximum ($MaxF_x$);

a third step to forward a permit by:

forwarding an idle permit, if the guarantee stack (GS) and the fair stack (FS) are both empty;

extracting a permit from the fair stack (FS) and forwarding it, if the guarantee stack (GS) is empty and the fair stack (FS) is not empty;

extracting a permit from the guarantee stack (GS) and forwarding it, if the guarantee stack (GS) is not empty.

15. The medium access controller according to claim 14, further characterised in that it comprises programmed means for performing the second step only if the guarantee stack (GS) is empty.

16. The medium access controller according to claim 14, further characterised in that it comprises programmed means for performing the second step only if the guarantee stack (GS) and the fair stack (FS) are empty, and for repeating the second step until the fair stack is not empty.

17. The communication network according to claim 14, further characterised in that the medium access controller comprises programmed means for dynamically updating the fair increments ($IncF_x$) and/or the fair maxima ($MaxF_x$) according to a load measurement of their corresponding network terminal.

18. The method according to claim 17, further characterised in that the medium access controller comprises programmed means for performing said load measurement based on a queue length.

19. The method according to claim 18, further characterised in that the medium access controller comprises programmed means for performing said load measurement by comparing said queue length to a predetermined threshold value.

\* \* \* \* \*